(12) United States Patent
Furuichi et al.

(10) Patent No.: US 6,731,462 B1
(45) Date of Patent: May 4, 2004

(54) SLIDER AND HEAD ASSEMBLY

(75) Inventors: Shinji Furuichi, Mooka (JP); Takeo Sasaki, Kumagaya (JP)

(73) Assignee: IP Trading Japan Co., Ltd., Tokyo (JP)

( * ) Notice: Subject to any disclaimer, the term of this patent is extended or adjusted under 35 U.S.C. 154(b) by 663 days.

(21) Appl. No.: 09/154,703

(22) Filed: Sep. 17, 1998

(30) Foreign Application Priority Data

Dec. 17, 1997 (JP) .............................. 9-348284

(51) Int. Cl.⁷ ................................ G11B 5/60
(52) U.S. Cl. ................ 360/234.6; 360/294.3; 360/294.5
(58) Field of Search ................ 360/109, 103, 360/234.6, 264.5, 294.1–294.6

(56) References Cited

U.S. PATENT DOCUMENTS 5,243,482 A * 9/1993 Yamaguchi et al. ........ 360/103
5,299,080 A * 3/1994 Mizuno et al. ............. 360/103

OTHER PUBLICATIONS

David A. Horsely, et al.; "Angular Micropositioner For Disk Drives"; MEMS 97, *The Tenth Annual International Workshops on Micro Electro Mechanical Systems*; IEEE Catalog No. 97CH36021; Jan. 26–30, 1997; pp. 454–459.

Toshiki Hirano, et al., "Invar Mems Milliactuator for Hard Disk Drive Application", MEMS 97, *The Tenth Annual International Workshops on Micro Electro Mechanical Systems*; IEEE Catalog No. 97CH36021; Jan. 26–30, 1997; pp. 378–382.

* cited by examiner

*Primary Examiner*—Robert S. Tupper
(74) *Attorney, Agent, or Firm*—Brinks Hofer Gilson & Lione

(57) ABSTRACT

A protective member, which covers a sensor portion, is positioned on a slider so that this sensor portion is in close proximity to the slider flying surface. Furthermore, a step is formed on the surface of this slider on the side opposite the flying surface at a location separated from the protective member. Then, an actuator is either mounted on the flat portion which was made thin by the formation of the step, or an actuator is stored and affixed within a slot created in line with the formation of the step. Furthermore, a suspension is bonded to a surface of this actuator on the side opposite the slider, and a head assembly is configured.

13 Claims, 8 Drawing Sheets

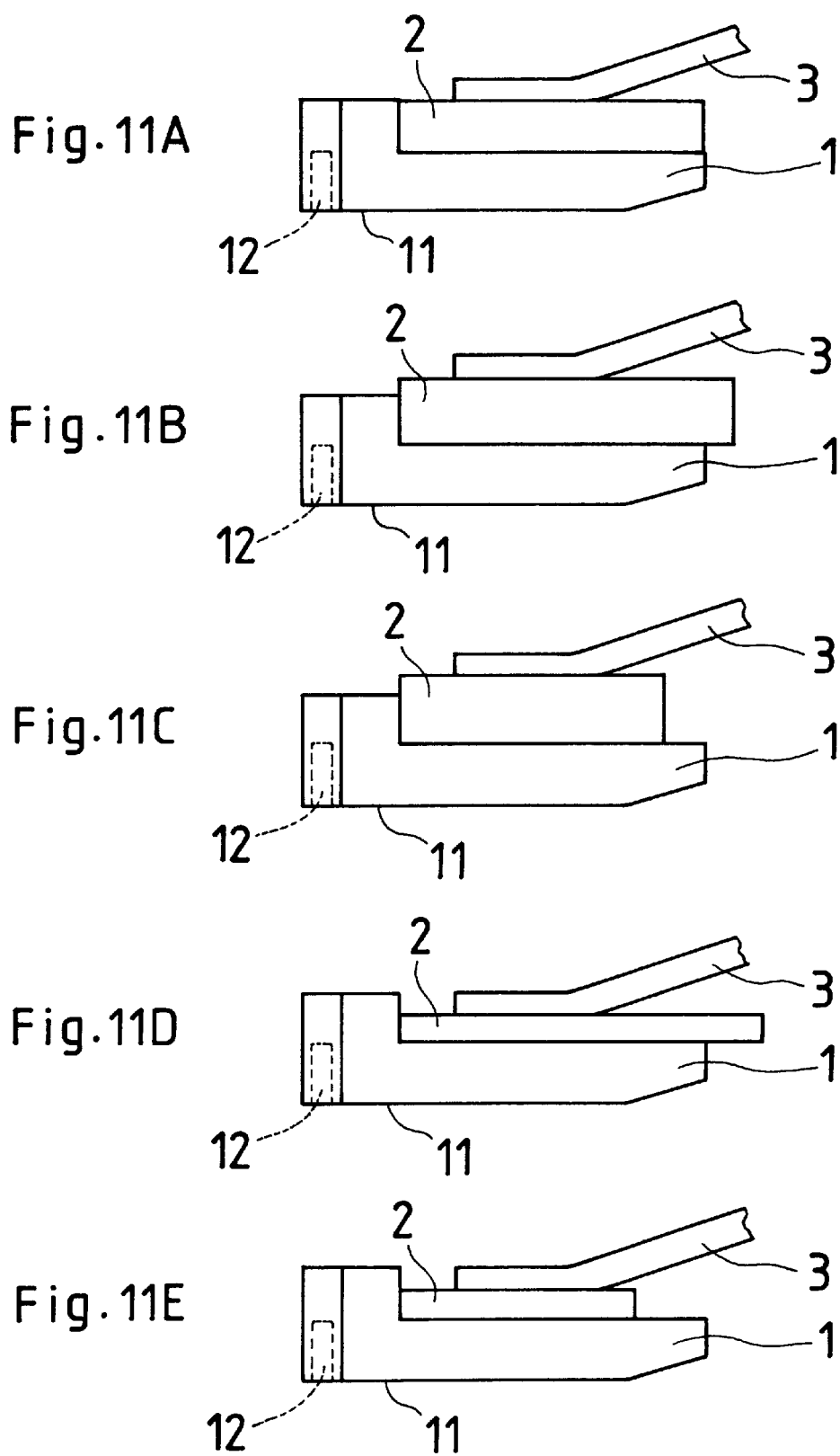

SLIDER AND HEAD ASSEMBLY

BACKGROUND OF THE INVENTION

1. Field of the Invention

The present invention relates to a slider or head assembly used in such fields as magnetic storage.

2. Description of the Related Art

A hard disk drive (hereinafter referred to as HDD) is a well known magnetic storage. An HDD utilizes a disk as a storage medium. The following is description of the case where a disk is used as a storage medium.

In the field of HDD, storage capacity is rapidly increasing. Storage media (hereinafter referred to as disks) and magnetic heads are being developed to cope with this high storage capacity. The magnetoresistive head (hereinafter referred to as MR head) is well known as a magnetic head that copes with high storage capacity.

An MR head that copes with high storage capacity is being manufactured with a track width on the order of several microns. Further, storage capacity is increasing at a rate approaching 5 Gb/in$^2$. A tracking operation in an HDD involves moving an MR head-equipped slider in a track on a disk and reading magnetic signals recorded on that track. In this tracking operation, a method is used whereby the slider is held by a suspension, and this suspension is driven by a voice coil motor.

The assembly that joins a suspension to a slider that positions an MR head is called a head assembly. A conventional example of this head assembly is described.

An HDD is provided with a voice coil motor (hereinafter referred to as VCM) near the base of the suspension. The VCM drives the suspension, and controls the position of the slider mounted at the tip of the suspension. The magnetic head is positioned above a track on a disk by controlling the position of the slider.

A track of several µm or less in width is provided on a disk, and the tracks are in close proximity to one another.

A slider has a flying surface that faces the disk. When the disk rotates, an airflow is produced between the slider flying surface and the disk, generating a force that causes the slider to float above the disk. In this manner, the MR head provided on the slider magnetically records information on the disk, and/or reads magnetically recorded information from the disk.

An increase in storage capacity affects recording and reading accuracy. Disk track width becomes narrower in line with increased storage capacity. As a result of this, finer tracking operations are required. Therefore, in this tracking operation, the MR head must be accurately moved to a micro-track region.

A tracking operation, as described above, means moving an MR head built into a head assembly to a track region by driving the head assembly suspension by using a VCM. However, because the accuracy of VCM-driven movement is limited, it is impossible to achieve high positioning accuracy.

With a low-positioning-accuracy tracking operation, the MR head is affected by an adjacent track, resulting in a heightened noise level. A rise in the noise level causes a drop in read-write accuracy.

Further, because the drive of the VCM is transmitted to the MR head via the suspension, it is not possible to drive the MR head with a high speed of response. When the head assembly drive speed is slow, it is impossible to speed up the overall write operations and read operations of an HDD, even though the signal frequency of the electronic circuit, which processes the write signals and read signals, is increased.

Conventional technology, which attempts to solve for the above-mentioned problems, is described below.

FIG. 14 is an oblique view showing a schematic of a head assembly disclosed in "INVAR MEMS MILLIACTUATOR FOR HARD DISK DRIVE APPLICATION" on pages 378–382 of IEEE Catalog Number 97CH36021, and "ANGULAR MICROPOSITIONER FOR DISK DRIVES" on pages 454–459 of the same catalog.

FIG. 14 shows a head assembly comprising a slider 901 having a flying surface 911, an actuator 902, a suspension 903, and an MR head 12.

The actuator 902 has a movable portion 922 on a substrate, as shown in FIG. 15, which is a cross-sectional view of the C–C' portion of FIG. 14. The actuator 902, rotating or linearly moving the movable portion 922, performs tracking by rotating or linearly moving the slider 901.

That is, with this technology, in addition to using a VCM to move (with rough movement) the MR head via a suspension, an attempt is made to enhance drive accuracy by mounting an actuator 902 to the slider 901 and utilizing this actuator 902 to refine the movement of the MR head.

Furthermore, when describing this technology, the drive portion 921 of the actuator 902 is affixed to the slider 901 side, while the movable portion 922 is affixed to the suspension 903 side. The rotating movement or linear movement of the movable portion 922 causes the slider 901 to rotate or to move linearly. The movement of the slider 901 implements the tracking of the MR head 12 with good accuracy at the prescribed position.

The problems that arise with the technology illustrated in FIGS. 14 and 15 when attempts are made to further increase storage capacity are described here.

As, in this prior art, mounted on top of the slider 901 is an actuator 902, which has a drive portion 921 and a movable portion 922 to move the MR head 12, the overall thickness and weight of the head assembly (in this prior art, this assembly comprises a slider 901 with an MR head, a suspension 903 and an actuator 902) increases by the amount of the actuator 902, and the center gravity is heightened.

The reading of a signal recorded on a disk is performed via the following operation. A slider of floating type is moved at high speed above the track to be read on a rotating disk. Hereinafter, the movement of this slider is called a seek operation. A sensor portion provided on the slider reads the magnetic storage recorded on a track. The slider is controlled so that the flying height, which is the distance between the built-in sensor portion and the disk, is constant.

A high center gravity position of a slider causes the slider to sink. A large slider sink results in larger angle of inclination of the slider flying surface which faces the surface of the disk. A large slider sink makes it impossible to control the flying height in a consistent manner. The problem is that a change in the flying height of a slider at seek causes the slider to make contact with the disk, damaging the disk. There is also the problem that a change in the flying height of a slider during reading generates noise.

Further, there is the problem that an increase in the weight of a slider increases the inertial force applied to the tip of the head assembly at seek, making tracking difficult.

A disk array HDD is formed by stacking a plurality of disks, a plurality of heads and a plurality of suspensions. In a disk array HDD, the distance between a slider's flying surface and a suspension is the sum of the respective thicknesses of the slider, head and suspension. An increase in the thickness of each component increases the spacing between the disks, increasing the thickness of the HDD. An increase in the thickness of the HDD makes it difficult to incorporate the HDD into equipment such as portable personal computers, which are required to make the overall thickness thinner.

OBJECTS AND SUMMARY OF THE INVENTION

An object of the present invention is to design a head assembly of the type that has an actuator built into the slider so as to curb the weight and thickness thereof.

The present invention makes the thickness of the slider partially thinner, forming a thin plane portion. The plane portion is formed by a step portion or a flat portion on the slider. The head assembly is configured by joining an actuator to the thin plane portion. This configuration makes the thickness of the assembly that joins together the slider and the actuator substantially thinner. The present invention prevents increases in the thickness and weight of the tip of the head assembly, and stabilizes flying characteristics.

The plane portion is formed on the surface of the side opposite the flying surface of the slider. The plane portion is used as the support surface, which supports the actuator on top of the slider. A convex portion is formed on the same surface as the plane portion. The convex portion is used as a positioning member when joining the actuator to the slider. The convex portion and the plane portion join the actuator to the slider with high positional accuracy. High positional accuracy joining prevents the relative relationship between the amount of drive of the actuator and the amount of movement of the sensor portion provided in the slider from varying in accordance with the product.

For a first slider according to the present invention, the surface of one side thereof is the flying surface, and the surface on the opposite side of this surface forms a step, and the upper surface of the portion that becomes lower by the formation of this step becomes the surface for storing or mounting an actuator.

Furthermore, a protective member enclosing a sensor portion is mounted to this slider. This sensor portion is positioned in close proximity to the flying surface. The step portion is formed separate from the protective member enclosing the sensor portion, and the actuator is provided in the plane portion of the step portion. The portion of the sensor portion facing the storage medium is exposed, and the other portion is enclosed in the protective member.

The step portion is formed by a step, indent, slot, or notch formed in the surface of the slider opposite the flying surface. It is desirable for the step portion to provide a flat bottom surface or plane for joining the actuator. In joining the actuator and the slider, it is desirable that the thickness of the actuator and slider assembly when the actuator is joined to the step portion be smaller than the dimensions achieved by adding the respective thicknesses of the slider and actuator. Furthermore, the separation of the protective member and the step portion makes it possible to count on the effect whereby the strength of the protective member is not lost when the step portion is formed by cutting work, and also makes it possible to maintain the strength of the slider, and to relieve strain.

Instead of a configuration, wherein the sensor portion is enclosed in the above-mentioned protective member, it is possible to use a configuration, wherein it is embedded within the slider with one part exposed.

For a second slider according to the present invention, the surface of one side thereof is the flying surface, and the surface on the opposite side of this surface is a flat surface, and a positioning member of a prescribed width and prescribed height for positioning an actuator is affixed to the top of this flat surface.

Furthermore, a protective member enclosing a sensor portion is mounted to this slider. This sensor portion is positioned in close proximity to the flying surface. Further, an actuator is provided on the flat surface. Installing the actuator to the flat surface of the slider makes it possible to reinforce the strength of the thin slider. The portion of the sensor portion facing the storage medium is exposed, and the other portion is enclosed inside the protective member.

The positioning member is formed using a lug or convex portion, and the actuator is affixed by bringing it in contact with this lug or convex portion. The positioning of the actuator relative to the slider is performed by bringing the actuator in contact with the lug or convex portion.

It is desirable to maintain the mechanical strength of the slider and actuator assembly by joining the actuator to both the flat surface of the slider and the positioning member. Further, the positioning member can be utilized as a mark for measuring the relative position of the actuator with regard to the slider. The positioning member can be configured as part of the slider, or it can also be configured as a separate member, which joins to the slider.

For the present invention, it is desirable that the joining of the slider and the actuator be carried out using a conductive adhesive between the two members. Joining via a conductive adhesive connects the slider to the actuator electrically. Further, the actuator and the suspension are also connected electrically. Static electricity that builds up in the slider or actuator can escape to the ground via the suspension, and this ground can prevent the dielectric breakdown of the MR head.

The actuator of the present invention comprises a movable portion and a drive portion on a substrate. The drive portion is the component that drives the movable portion, and it is desirable that it generates an electrostatic or electromagnetic driving force. Furthermore, as for the actuator substrate, it is desirable that the length or width thereof be around 0.3–1.5 mm.

For the present invention, it is desirable that the thickness of the assembly of the slider and actuator be in the range of 0.2–0.65 mm. The assembly thickness refers to the sum of the thickness of both the parts of the slider and actuator, which are joined together, and the thickness of the adhesive applied between these parts.

For the present invention, an MR head, optical head or magneto-optical head can be utilized as the sensor portion. The sensor portion is provided in close proximity to the flying surface. The meaning of this term close proximity includes the situation wherein at least a part of the sensor portion is on the same plane as the flying surface, the situation wherein at least a part of the sensor portion is on the same plane as the flying surface by way of an overcoat film, which covers the flying surface, and the situation wherein the sensor portion and flying surface are separated within a range wherein the sensor portion can read the signals on the disk.

The slider and head assembly of the present invention join a suspension to the side of the slider that is opposite the side to which the actuator is joined. In the head assembly, preferably, the actuator comprises a substrate and a movable portion, the actuator substrate is joined to either the step portion of the first slider or the flat surface of the second slider, and the movable portion of the actuator is joined to the suspension. Even more preferable, it is assumed that by intervening a conductive adhesive at two actuator joining areas, it is possible to prevent the electrostatic charges that occur between the actuator and the suspension or slider.

For the present invention, the sensor portion and actuator have electrode portions, and the suspension has a wiring portion. Each electrode portion is electrically interconnected to corresponding components of the wiring portion by bonding wire. As the electrode portion, metal pads or metal terminals, and the end of a conductive film can be used. On the other hand, as the wiring portion, covered lead wire or flexible printed-wiring can be used.

BRIEF DESCRIPTION OF THE DRAWINGS

The foregoing and other objects and features of the invention will become apparent from the following description of preferred embodiments of the invention with respect to the accompanying drawings, in which:

FIG. 11A through FIG. 11E are diagrams illustrating configurations of head assemblies according to embodiments of the present invention, wherein various sized actuators are mounted to an actuator mounting surface formed as part of a slider;

DETAILED DESCRIPTION OF THE PREFERRED EMBODIMENTS

The present invention includes 3 types of configurations; slider unit, an assembly in which an actuator is mounted to a slider, and an assembly composed of a slider, an actuator and a suspension.

First, a first embodiment of a head assembly of the present invention is described with reference to FIG. 1 and FIG. 2.

Figure 1:
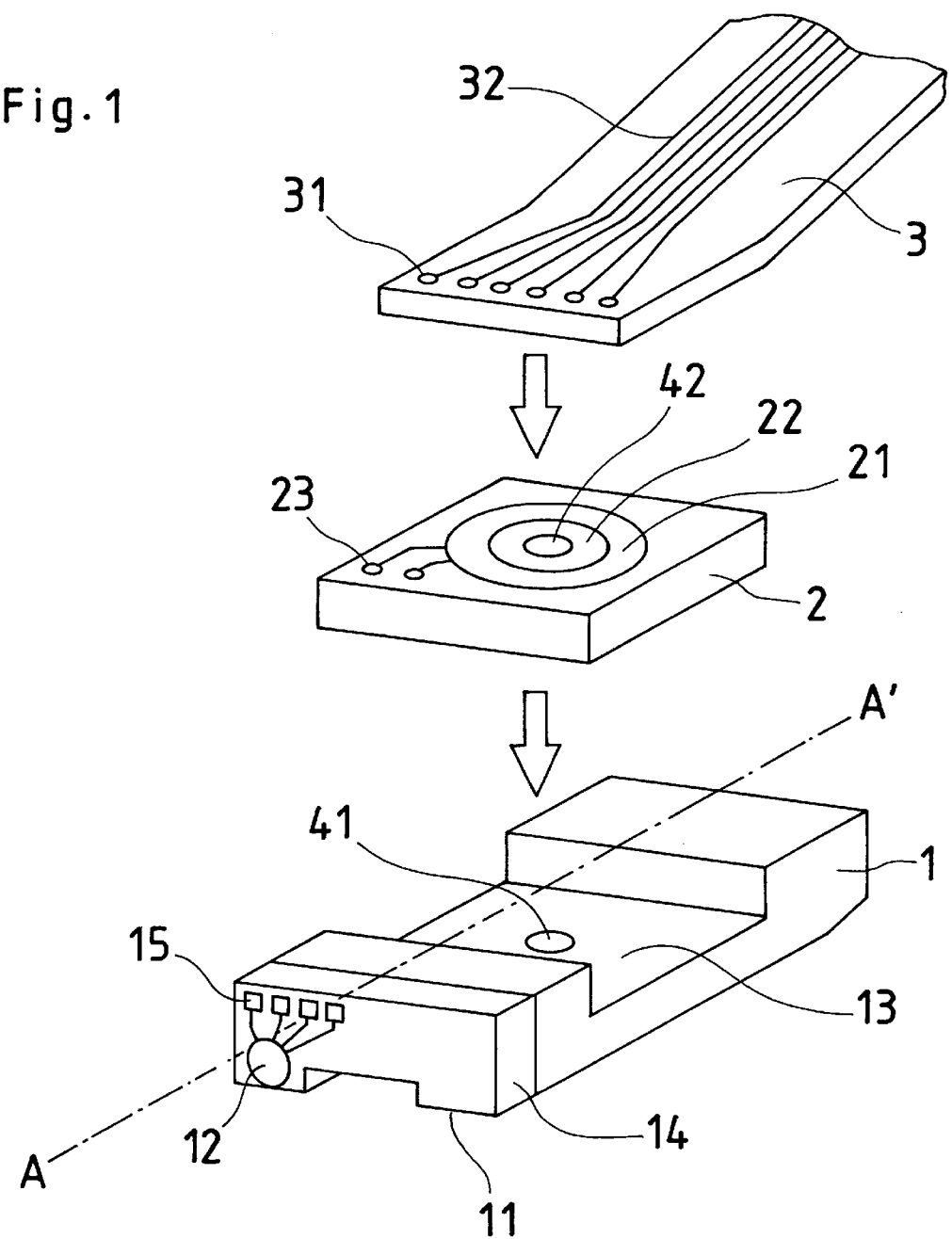
FIG. 1 is an oblique view of a head assembly, with components separated, according to a first embodiment of the present invention.

In FIG. 1, a slider 1, an actuator 2 and a suspension 3, components of a head assembly, are shown separately.

The slider 1 has a flying surface 11 and a slot 13. The slot 13, having a certain width, is formed in the side opposite this flying surface 11. The slider 1 also comprises an MR head 12, which is covered by a protective member 14, and a pad 15, which is the electrode of the MR head 12.

Figure 2:
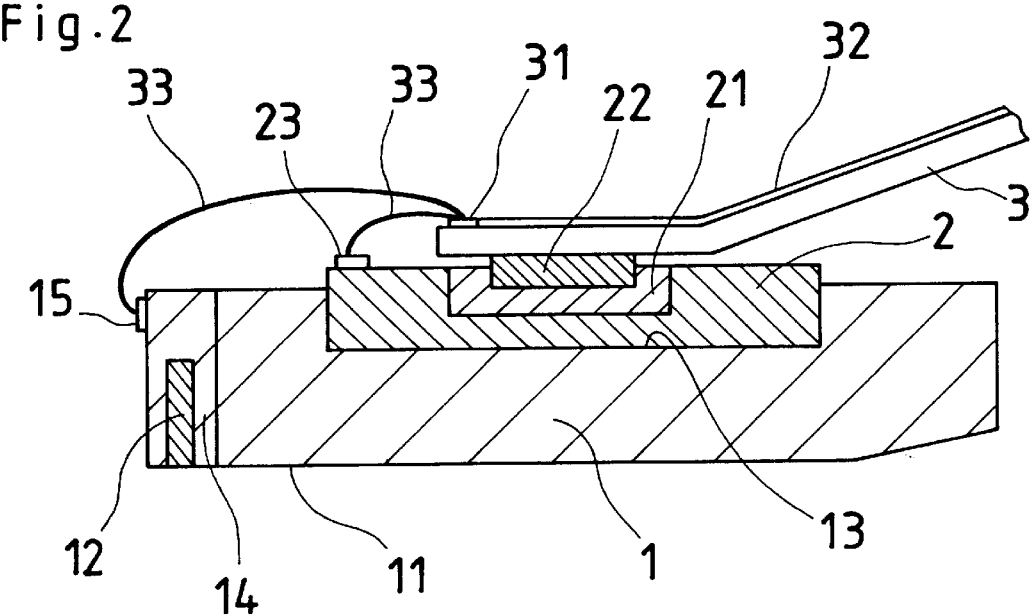
FIG. 2 is a cross-sectional view showing a cross section of FIG. 1 along the dotted line A–A'.

As for the MR head 12, one end thereof is exposed by the protective member 14, as shown in FIG. 2. The exposed edge of the MR head 12 is on the same plane as the flying surface 11 of the slider 1.

The actuator 2 has on a substrate a drive portion 21, a movable portion 22, and a terminal 23 which serves as an electrode that supplies current to the drive portion 21.

The suspension 3 has terminals 31, which are electrodes, and printed wiring 32, which is connected to these terminals 31.

To configure a head assembly by assembling the slider 1, actuator 2 and suspension 3, first, adhesive 41 is applied between the slider 1 and the actuator 2, and adhesive 42 is applied between the actuator 2 and the suspension 3.

Then, the actuator 2 is fitted into the slot 13 in the slider 1, and the two members are fastened together with adhesive 41. The actuator 2 and the extended end portion of the suspension 3 are also connected to one another using adhesive 42. Furthermore, wire 33 is used to form electrical interconnections between the terminals 31 and pad 15, and between the terminals 23 and terminals 31, respectively. The head assembly is assembled in this manner.

As for the assembled head assembly, as shown in FIG. 2, because the actuator 2 is stored in the slot 13 provided in the slider, the overall thickness does not increase.

Next, a second embodiment of a head assembly of the present invention is described with reference to FIG. 3. However, the suspension portion of the head assembly is omitted from the drawing in FIG. 3.

An MR head 12 covered by a protective member 14, and a pad 15, which is the electrode of the MR head 12, are mounted to a slider 1. Furthermore, a step portion 130 is formed in the side opposite the flying surface 11, making the slider 1 into a step shape, and, with the exception of the protective member 14 and the portion in close proximity thereto, a thin, flat portion 131 is formed.

Then, the actuator 2 is affixed to this thin flat portion 131 via adhesive (not shown). For example, the thickness (=c1) of the portion where the actuator 2 is joined to the slider 1, is 0.4 mm.

Figure 4A:
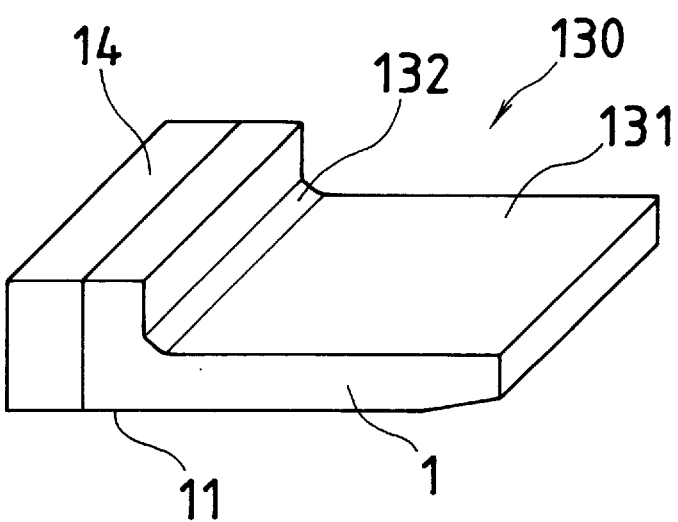
FIG. 4A is an oblique view of an element (slider) that comprises a head assembly according to a third embodiment of the present invention.

Next, a third embodiment of a head assembly of the present invention is described with reference to FIG. 4A and FIG. 4B.

An MR head 12 covered by a protective member 14 is mounted to a slider 1. Furthermore, similar to the second embodiment illustrated in FIG. 3, a step portion 130 is formed in the side opposite the flying surface 11, making the slider into a step shape, and, with the exception of the protective member 14 and the portion in close proximity thereto, a thin, flat portion 131 is formed. However, this third embodiment differs from the second embodiment in that a curved surface portion 132 is formed between the vertical wall and flat portion 131 that comprises the step portion 130, as shown in FIG. 4A and FIG. 4B.

Figure 3:
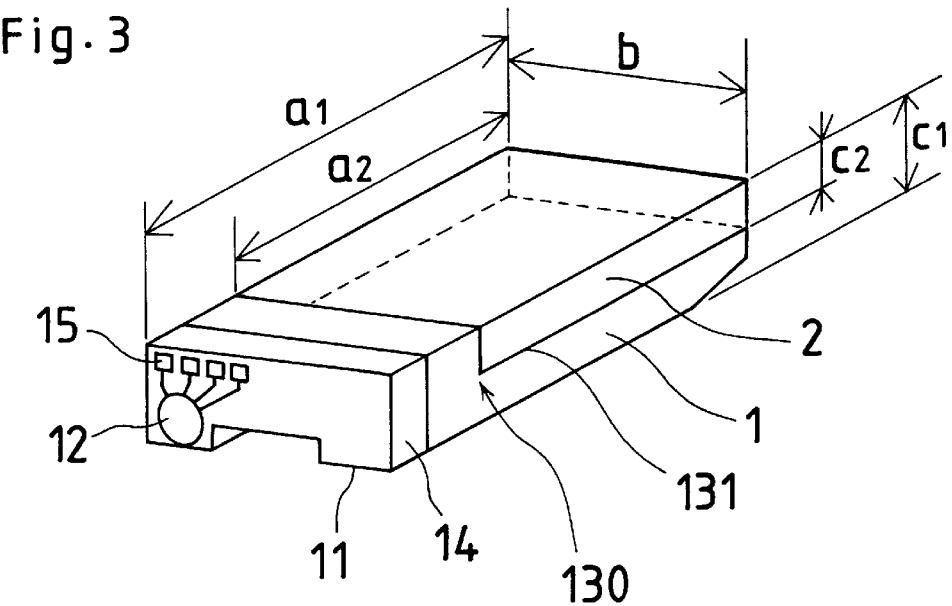
FIG. 3 is an oblique view of elements (slider and actuator) that comprise a head assembly according to a second embodiment of the present invention.
Figure 4B:
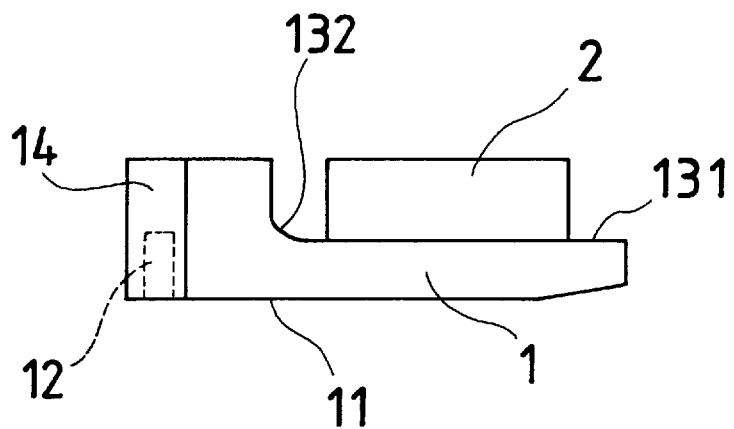
FIG. 4B is a side view showing the state when an actuator is installed in the slider of FIG. 4A.

An actuator 2 is affixed onto the flat portion 131 of the step portion 130 using a conductive adhesive (not shown), avoiding the curved surface portion 132 as shown in FIG. 4B. In the second embodiment shown in FIG. 3, the actuator 2 is placed on the entire flat portion 131 of the slider 1, but in this third embodiment, since the dimensions of the bottom surface of the actuator 2 are smaller than the dimensions of the flat portion 131, the actuator 2 can be positioned at any location on the flat portion 131 of the slider 1.

A suspension is not illustrated in FIG. 4B, but when the end of a suspension is affixed to the actuator shown in 4B, the head assembly is complete.

Next, a fourth embodiment of a head assembly of the present invention is described with reference to FIG. 5.

The slider 1 itself has the same structure as the slider 1 illustrated in FIG. 3. That is, an MR head 12 covered by a protective member 14 is mounted to the slider 1, a step portion 130 is also formed in the side opposite the flying surface 11, and, with the exception of the protective member 14 and the portion in close proximity thereto, a thin, flat portion 131 is formed.

Figure 5:
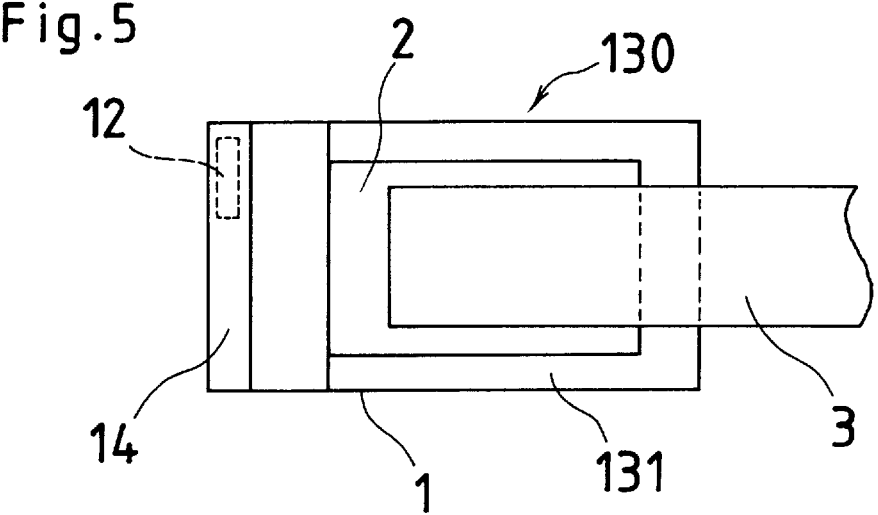
FIG. 5 is a top view of a head assembly according to a fourth embodiment of the present invention.

However, as for the actuator 2, as shown in FIG. 5, the width dimensions and length dimensions of the bottom thereof are smaller than the width dimensions and length dimensions of the flat portion 131 of the slider 1.

Next, a fifth embodiment of a head assembly of the present invention is described with reference to FIG. 6. However, the suspension portion of the head assembly is omitted from the drawing in FIG. 6.

Figure 6:
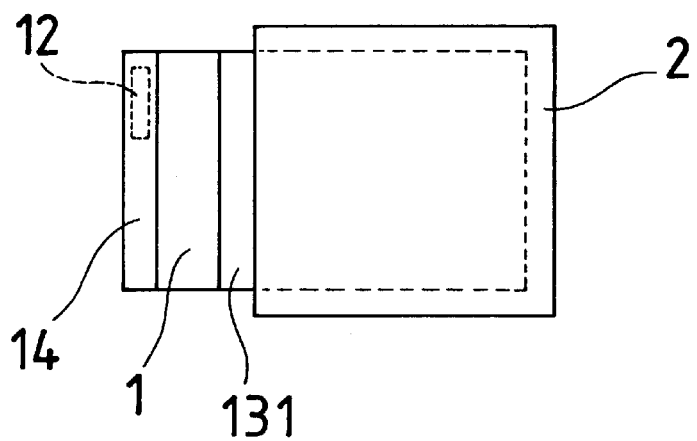
FIG. 6 is a top view of elements (slider and actuator) that comprise a head assembly according to a fifth embodiment of the present invention.

In this fifth embodiment, as shown in FIG. 6, the width dimensions of the bottom of the actuator 2 are larger than the width dimensions of the flat portion 131 of the slider 1.

To miniaturize the head assembly, the miniaturization of each element that constitutes the head assembly is carried out. However, when the dimensions of the actuator 2 are less than 1.0 mm$^2$, it becomes impossible to grasp that actuator 2 with a pair of tweezers or some other jig to affix it to the flat portion 131 of the slider 1.

Accordingly, in this fifth embodiment, an effort is made to miniaturize the head assembly by miniaturizing only the slider 1, while enabling the actuator 2 to be handled by a pair of tweezers or some other jig in assembling the head assembly.

Figure 7:
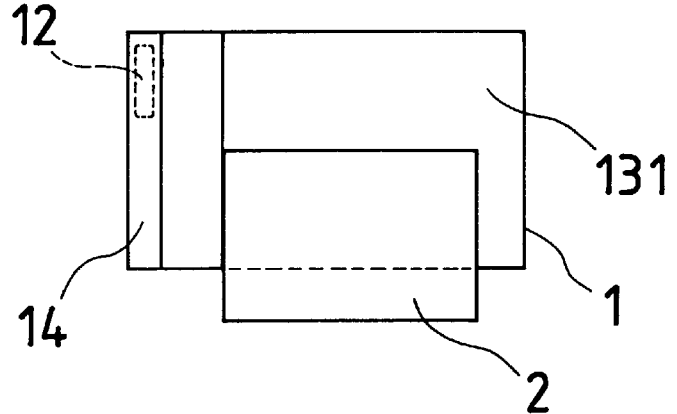
FIG. 7 is a top view of elements (slider and actuator) that comprise a head assembly according to a sixth embodiment of the present invention.

Next, a sixth embodiment of a head assembly of the present invention is described with reference to FIG. 7. However, the suspension portion of the head assembly is omitted from the drawing in FIG. 7.

The structure of the slider 1 and actuator 2 that constitutes the head assembly of this sixth embodiment is the same as the structure of the slider 1 and actuator 2 that constitutes the head assembly of the fourth embodiment illustrated in FIG. 5. However, in this sixth embodiment, the actuator 2 is connected to a location that is shifted in a transverse direction from the center of the flat portion 131 of the slider 1 as shown in FIG. 7. Consequently, transverse inclination adjustment of the slider 1 can readily be performed by the actuator 2.

Figure 8:
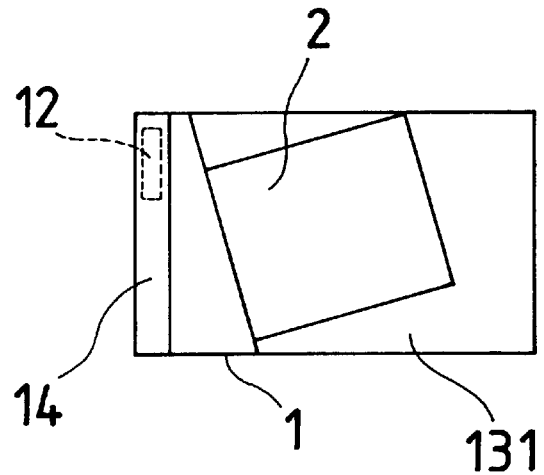
FIG. 8 is a top view of elements (slider and actuator) that comprise a head assembly according to a seventh embodiment of the present invention.

Next, a seventh embodiment of a head assembly of the present invention is described with reference to FIG. 8. However, the suspension portion of the head assembly is omitted from the drawing in FIG. 8.

An MR head 12 covered by a protective member 14 is mounted to the slider 1. As for the slider 1 in the sixth embodiment illustrated in FIG. 7, the vertical surface, which constitutes the step for forming the flat portion 131 thereof, is formed perpendicular to the side edge of the slider 1. But in this seventh embodiment, as shown in FIG. 8, the vertical surface which constitutes the step is formed inclined relative to the side edge of the slider 1.

As a result of this, the actuator 2 is mounted in an inclined state relative to the slider 1. The angle of inclination thereof can be established in correspondence with the physical relationship between the longitudinal direction of the slider 1 and the direction of rotation of the HDD disk. This enables the optimization of the direction of the MR head 12 relative to the magnetic storage direction of the disk.

Next, an eighth embodiment of a head assembly of the present invention is described with reference to FIG. 9. However, the suspension portion of the head assembly is omitted from the drawing in FIG. 9.

An MR head 12 covered by a protective member 14 is mounted to the slider 1. A notch 135 of a certain depth, which, viewed from above, is rectangular, is formed in the center portion of the side opposite the flying surface of this slider 1. The actuator 2 is stored inside this notch 135, and is joined to the slider 1 with an adhesive (not shown).

The following is a description of a slider 1 and an actuator 2, which are used in common in each of the embodiments above.

Ceramics is used as the slider material. Specifically, an alumina titanium carbide material, and α hematite can be used. On the other hand, as the substrate material which constitutes the actuator, it is desirable to use a silicon substrate for which etching is easy, since it is necessary to separate the movable portion from the drive portion during the actuator manufacturing process. From the standpoint of preventing electrostatic charge, it is desirable to use a ceramics that has conductivity in both the slider and the actuator.

The configuration of a slider 1 which mounts an actuator 2 can be any one of a floating type, semi-contact type or contact type. Here, a floating type is also referred to as a non-contact type. Further, a semi-contact type is also referred to as a near-contact type. A slider of semi-contact type can assume both a state of contact and a state of non-contact with a disk during tracking or signal reading. As for a slider of contact type, a portion of the slider makes contact with the disk. Of these configurations, the slider of floating type is especially desirable.

The reason why a slider of floating type is desirable is due to the fact that the load of the frictional force applied to the actuator when the slider is tracking is smaller for a slider that does not make contact with the disk than for a slider of contact type. Therefore, a slider of floating type is able to perform tracking faster, and more accurately than a slider of contact type. Further, a slider of floating type has the advantage of making it easier to miniaturize the actuator as compared with a slider of contact type, since a slider of floating type can be made to rotate or move straight ahead using a force that is smaller by the amount of the frictional force that is applied to the slider of contact type but not to the slider of floating type.

When the thickness of the slider unit or actuator unit is made thinner, the respective mechanical strength thereof decreases greatly, and can become the cause of the deterioration of slider flying characteristics. Further, there is also the danger that the slider and actuator will be damaged during handling, and/or that warping and waviness will occur in the slider and actuator when the slider, actuator and suspension are joined with adhesive, thereby causing flying characteristics and actuator functions to decline.

For example, when a slider is 2.85 mm long, 2.24 mm wide and 0.61 mm thick, if this slider is made even thinner by cutting work, the flatness of the flying surface worsens and the flying characteristics deteriorate.

Further, when a slider is 2.01 mm long, 1.60 mm wide and 0.46 mm thick, if this slider is made even thinner by cutting work, not only does the flatness of the flying surface worsen, but mechanical strength becomes inadequate as well.

Accordingly, in addition to leaving an area that is not subjected to cutting work on the surface opposite the flying surface of the slider, an actuator is joined to the area that is cut, and the slider and actuator are mated, thereby making it possible to enhance strength. Further, the area not subjected to cutting work has the function of a beam in the slider, enabling increased strength and rigidity.

Then, by providing a suspension to the slider to which the actuator is attached, it is possible to ensure the strength of the head assembly utilized in an HDD.

By adopting such means, the thickness of the assembly composed of the actuator and the slider can be made around 0.2–0.65 mm.

When utilizing an MR head as the sensor portion, a head that makes use of the magnetoresistive effect, such as a SAL bias MR head, spin bulb head, GMR head, or tunnel effect MR head, can be used as the MR head.

Further, when utilizing an optical head or magneto-optical head as the sensor portion, a Kerr effect magneto-optical disk drive, phase change optical disk drive, or a magneto-optical disk drive of a near field record (NFR) system can apply to the slider which constitutes the head assembly.

Further, the slider or head assembly of the present invention can be applied to a storage device, which requires a narrow read/write track width pursuant to enhancing storage capacity.

The adhesive member provided between the slider and actuator, or between the actuator and suspension can utilize an adhesive, resin, adhesive-coated sheet material, or a print that has adhesiveness. Furthermore, it is desirable that the adhesive member have at least one property of such properties as conductivity, thermosetting, and ultraviolet curing. An adhesive member that has conductivity can form an electrical interconnection between the joined members, and can be effective at removing static electricity. An adhesive member that has thermosetting or ultraviolet curing capabilities enables the adhesive to be processed easily via the irradiation of heat or ultraviolet rays.

The following is a description of a number of manufacturing methods for a head assembly according to the present invention. Further, the slider that constitutes the head assembly described here is equipped with an MR head.

(First Manufacturing Method)

First, a large number of MR heads are formed on a disc-like substrate called a wafer. This substrate is cut and divided along arrays of MR heads, forming rectangular strip shaped members called "row". A row comprises a plurality of MR heads lined up in a row shape. In a row state, one of the cut and divided surfaces becomes a flying surfaces of sliders, and the other becomes a surface to which actuators are mounted. The MR heads are exposed on the flying surface.

In a row state, a notch is formed by cutting a part of the surface opposite the surface that forms the flying surface. The notch is formed so that it extends along the length of the row at a constant depth. After a notch is formed in one surface thereof by cutting, the row is cut and divided along an orientation that is nearly perpendicular to the direction in which the notch is formed, thereby forming individual sliders. Also, with this cutting and dividing, the direction of the thickness of the wafer becomes the direction of the length of a slider (See FIG. 3).

Figure 9:
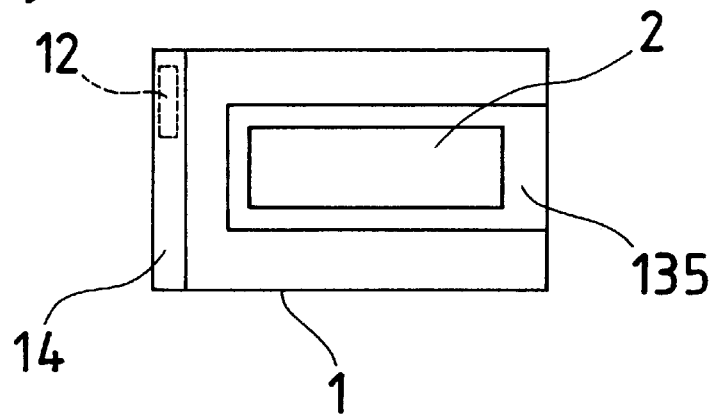
FIG. 9 is a top view of elements (slider and actuator) that comprise a head assembly according to an eighth embodiment of the present invention.

In the cut and divided slider 1, the notch cut in one surface of the row, either becomes a notch 13 that is open on both ends as shown in FIG. 1, or a notch 135 that is open on one end as shown in FIG. 9.

A conductive adhesive is applied to the bottom of this notch 13, 135, so that an actuator 2 is joined to the slider 1. A conductive adhesive is also applied to the movable portion formed in this actuator 2 so that a suspension is joined thereto. This forms a head assembly.

Furthermore, in the above description, the notch is cut at the stage of row, but instead of this, the notch can also be cut and formed in a slider unit after cutting this slider unit from a row.

(Second Manufacturing Method)

A second manufacturing method, as a substitute for the first manufacturing method, is one which forms a step by using a grinder to cut one end portion of the surface of the side opposite the flying surface of a row. Further, the upper surface of the portion that became lower as a result of the formation of the step is formed parallel to the flying surface. With the exception of the process that creates the step, this method can be carried out in the same manner as the first manufacturing method.

(Third Manufacturing Method)

With this method, the notch is formed in the surface of the side opposite the flying surface in the row state, using an etching process that makes use of photolithography, rather than by cutting. In this process, the surface of the side opposite the flying surface is covered with a mask, and the open portion of the mask is placed in a location that corresponds to the notch to be formed. Then, an etching process is performed from the top of the mask. When this is done, an area corresponding to the open portion of the mask is cut out, and the notch of desired dimensions is formed. After that, the mask is removed.

(Fourth Manufacturing Method)

With this method, a positioning portion is formed in the surface of the side opposite the flying surface of the slider. In the row state, photolithography is used to perform an etching process on the surface of the side opposite the flying surface leaving a convex portion, which becomes the positioning portion. As for the surface other than the convex portion, an etching process is performed so that it becomes a flat surface that has sufficient width to connect at least an actuator. After this etching process, sliders are formed by cutting and dividing the row.

Figure 10A:
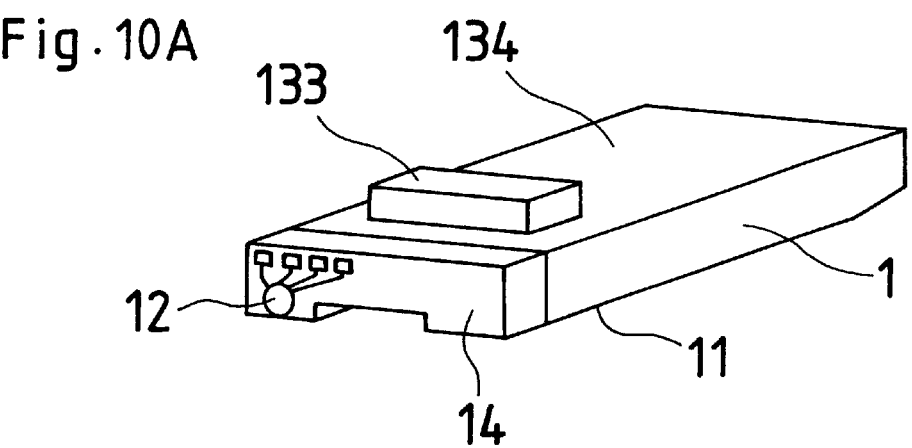
FIG. 10A is a top view of elements (slider and actuator) that comprise a head assembly according to a ninth embodiment of the present invention.
Figure 10B:
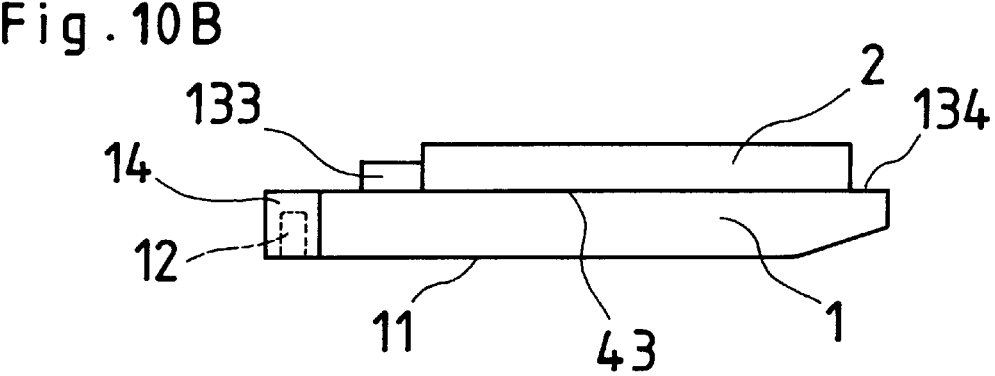
FIG. 10B is a side view showing the state when an actuator is installed in the slider of FIG. 10A.

A slider formed using this fourth manufacturing process is illustrated in FIG. 10A and FIG. 10B.

An MR head 12 covered by a protective member 14 is mounted to this slider 1. Furthermore, the surface of the side opposite the flying surface 11 constitutes a flat surface 134, and a positioning portion 133 of a prescribed width and prescribed height is formed on this flat surface 134. An actuator 2 is mounted on this flat surface 134. The positioning portion 133 determines the location of the actuator 2 on the flat surface 134 at this time.

As shown in FIG. 10B, an actuator 2 is bonded on the flat surface 134 of the slider 1 by intervening an adhesive layer 43 (not illustrated in the drawing). When the actuator 2 is bonded to the flat surface 134, the vertical wall of the positioning portion 133 is treated as a reference position, and the relative positions of the slider 1 and actuator 2 are adjusted. For example, the actuator 2 is mounted by bringing one end thereof in contact with the vertical wall of the positioning portion 133. As a result of this mounting, the actuator 2 can be positioned at a prescribed location established by the positioning portion 133 on the flat surface 134.

The actuator 2, as explained previously with reference to FIG. 1, comprises a substrate, and a drive portion 21 and a movable portion 22 provided on the substrate. The drive portion 21 comprises a coil (not shown) that generates a magnetic field for moving the movable portion 22, and an electrode that supplies current to the coil. The movable portion 22 comprises a core that receives the magnetic field generated by the drive portion 21 to perform straight line or rotation reciprocating motion, and a bridge (not shown), that connects the core to the substrate. The bridge is capable of oscillation or expansion/contraction.

The procedure for bonding an actuator to a slider is described below using FIG. 10A and FIG. 10B.

The slider 1 is fixed to a jig (not shown) with the flying surface 11 down. Then, this jig is placed on a stereoscopic microscope table (not shown) that has a visible scale. An ultraviolet curing resin is applied to the flat surface of the slider 1, and the substrate side of the actuator 2 is placed on the flat surface so that it covers the coated area. The resin spreads out by the force resulting from such placing of the actuator 2, and an adhesive layer 43 is formed. Incidentally, the actuator 2 is not attached on the top face of the positioning portion 133.

Positioning of the actuator 2 on the flat surface 134 of the slider 1 is performed by observing an image in the stereoscopic microscope. Using the vertical wall of the positioning portion 133 as a reference position, and the scale of the microscope as a position standard, the position of the actuator 2 is adjusted by moving it on the flat surface 134 of the slider 1 using a pair of tweezers.

When the actuator 2 and slider 1 are rectangular parallelepipeds, the position of the actuator 2 cannot be determined using the positioning portion 133 alone. The position of the actuator 2 with respect to the slider 1 can be determined by matching up the center lines of the actuator 2 and slider 1 in the longitudinal direction.

Once positioning is complete, the actuator 2 and slider 1 are temporarily clamped in the jig, the ultraviolet curing resin is hardened by ultraviolet ray irradiation, and the actuator 2 is temporarily fastened.

Ultraviolet curing resin is applied to the movable portion side of the actuator, which has been temporarily fastened to the slider, that is, to the side opposite the side facing the slider. Then, a suspension (not shown) is put on top of the actuator, to which the ultraviolet curing resin has been applied, and clamped in a jig. After that, the ultraviolet curing resin is hardened by ultraviolet ray irradiation, the suspension is temporarily fastened, and the head assembly is configured.

This head assembly is placed in an annealing device, and the ultraviolet curing resin (placed between the slider 1 and actuator 2, and between the actuator 2 and suspension 3) is hardened, forming firm bonds at the contact points between the slider 1 and actuator 2, and between the actuator 2 and suspension 3. As an example of heat treatment conditions, the temperature can be 120° C., the time can range between 45 to 90 minutes, and it can be done in an air atmosphere.

Once annealing is over, the head assembly is removed from the jig, a wire bonding technique is used to form electrical interconnections using thin metallic wire, such as Au or Al, between the 4 pads that constitute the electrodes of the MR head and the terminals on the printed wiring provided on the suspension, and between the 2 or 3 terminals that constitute the electrodes of the actuator and the terminals on the printed wiring provided on the suspension, respectively.

The head assembly of the present invention can be formed in accordance with the above-described process.

Further, by utilizing a material that is capable of oscillation and expansion/contraction as the printed wiring provided in the suspension, a ball bonding technique can also be used in place of wire bonding.

(Example of Head Assembly)

The following is a description of the results of connecting to a VCM and mounting in an HDD a head assembly that utilizes a slider formed with a step, which is an embodiment of the present invention.

Here, an example of the dimensions of a slider formed with step is described using FIG. 3. A slider 1 prior to forming a step has a length in the longitudinal direction (=a1) of 1.8 mm, a length in the transverse direction (=b) of 1.5 mm, and a thickness (=c1) of 0.46 mm. Then, a step portion is formed by shaving off a part of the surface of this slider 1 on the side opposite the flying surface 11, where an MR head is not provided. The dimensions of the volume to be shaved off have a length in the longitudinal direction (=a2) of 1.4 mm, a length in the transverse direction (=b) of 1.5 mm, and a thickness (=c2) of 0.2 mm.

The actuator 2, which is bonded to this step portion, has a length in the longitudinal direction of 1.4 mm (=a2), a length in the transverse direction of 1.5 mm (=b), and a thickness of 0.20 mm (=c2). That is, the volumetric dimensions of this actuator 2 conform to the dimensions of the volume showed off for forming a step portion in the slider 1.

The head assembly is configured by applying a conventional suspension to this actuator 2.

This head assembly was used to study the flying characteristics of the slider. The results of a seek test, in which the disk was rotated at 5400 rpm (revolution per minute) indicated that slider sink was about the same as that for a slider that did not have a step, which was tested under the same conditions for the sake of comparison, and that the flying height was practically constant at 50 nm.

As for this head assembly, as explained above, the length, width and height dimensions of the actuator 2 conform to the dimensions of the volume shaved off for forming a step portion in the slider 1 (that is, the length and width dimensions of the flat surface of the slider 1, and the height of the step portion), but it is not necessarily required that the dimensions of the actuator 2 conform to those of the shaved-off volume.

Accordingly, the following is a description with reference to FIG. 11A through FIG. 11E of the formation of a step portion by shaving off a part of the surface of a slider 1 on the side opposite the flying surface 11, where an MR head is not provided, thus enabling an actuator 2 having a variety of dimensions to be mounted on the flat surface 131 of the shaved-off part.

As for the head assembly in FIG. 11A, the volumetric dimensions of the actuator 2 are practically the same as those of a portion of the slider 1 shaved-off for forming a step portion. The upper surface of the actuator 2 (the surface on which a suspension 3 is bonded) is practically the same surface as the surface of the slider 1 where the step was not cut. Further, the end surfaces of the actuator 2 and slider 1 on the side opposite the MR head 12 are practically on the same plane.

As for the head assembly in FIG. 11B, the volumetric dimensions of the actuator 2 are larger than those of a portion of the slider 1 shaved off for forming a step portion. Consequently, the upper surface of the actuator 2 protrudes upward from the surface of the slider 1 where the step was not cut. Furthermore, the rear end surface of the actuator 2 protrudes backward from the rear end surface of the slider 1 (the end surface on the side opposite the MR head 12).

As for the head assembly in FIG. 11C, the upper surface of the actuator 2 protrudes upward more than the surface of the slider 1 where the step was not cut, and, the rear end surface of the actuator 2 is on the inside (forward) of the rear end surface of the slider 1.

As for the head assembly in FIG. 11D, the upper surface of the actuator 2 is in a lower position than the surface of the slider 1 where the step was not cut, and, the rear end surface of the actuator 2 protrudes backward from the rear end surface of the slider 1.

As for the head assembly in FIG. 11E, the upper surface of the actuator 2 is in a lower position than the surface of the slider 1 where the step was not cut, and, the rear end surface of the actuator 2 is on the inside (forward) of the rear end surface of the slider 1.

(Bond Between Actuator and Suspension)

As for the above-described embodiments, the actuator and suspension are manufactured separately, and bonded together with adhesive. In lieu of this, the actuator and suspension can also be manufactured in an integrated fashion. An example thereof is described below using FIG. 12A and FIG. 12B.

Figure 12A:
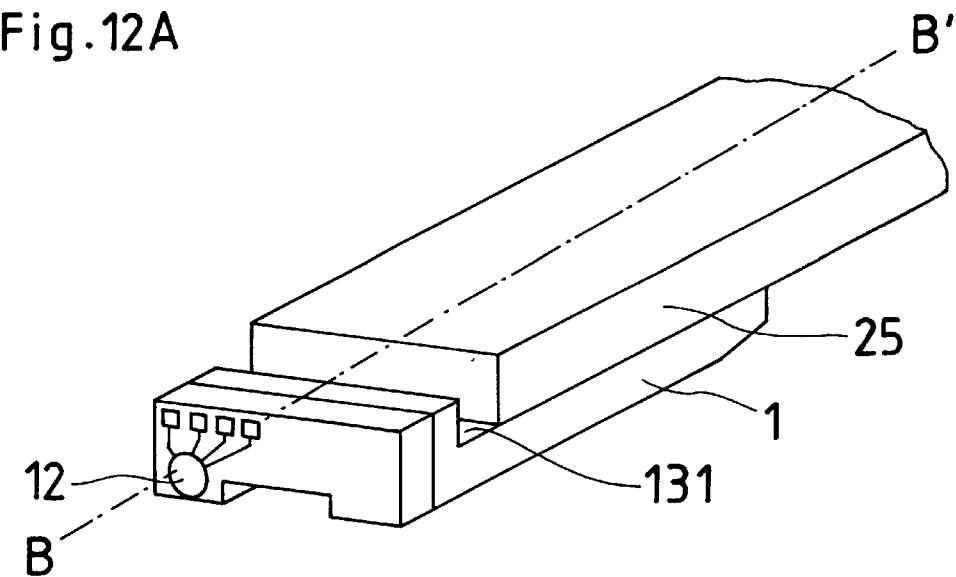
FIG. 12A is a diagram illustrating a configuration of a head assembly according to an embodiment of the present invention, wherein an actuator and a suspension manufactured as one body are mounted to an actuator mounting surface formed as part of a slider.
Figure 12B:
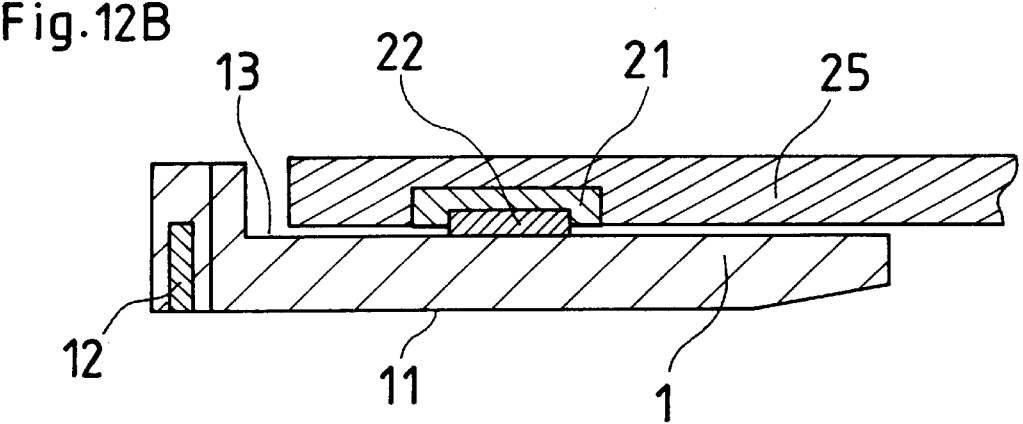
FIG. 12B is a cross-sectional view showing a cross section of FIG. 12A along the dotted line B–B'.

As shown in FIG. 12A, a member 25, which integrates an actuator and suspension, is affixed using adhesive to the flat portion 131 of that portion of the slider 1 that was made thinner by forming a step in the side opposite the flying surface. As shown in FIG. 12B, the movable portion 22 of the actuator is bonded to the flat portion 131. This bonding state is one feature of a configuration in which the actuator and suspension are integrated together.

This feature can also be applied to a slider mounted with an element other than an actuator. As such an element other than an actuator, included is a mount for an optical system, such as a lens or reflecting mirror, or a portion thereof, or a light generating apparatus, such as a laser light source unit, or a portion thereof, or power transmission/signal transmission means, such as printed wiring, or a portion thereof.

(Head Slider)

Figure 13:
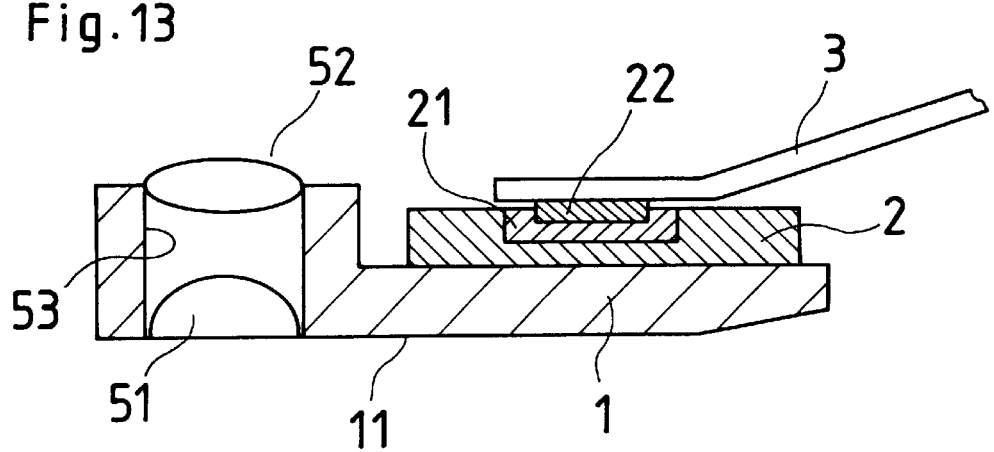
FIG. 13 is a diagram showing a head assembly according to an embodiment of the present invention, which has a slider comprising a sensor, which comprises a condenser lens and an objective lens for irradiating a laser beam.
Figure 14:
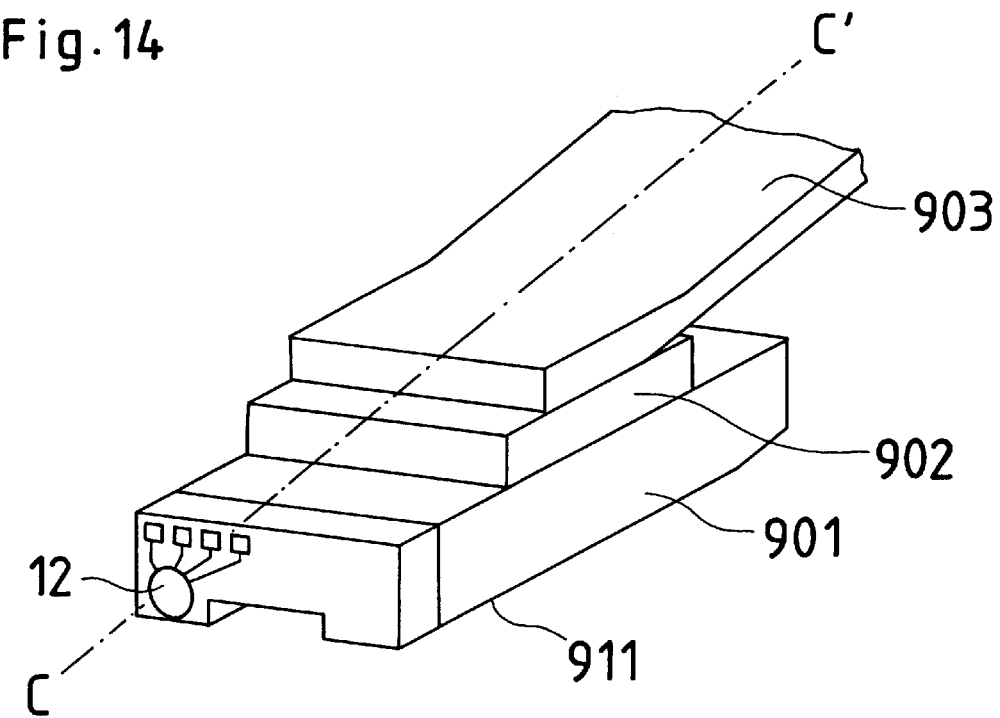
FIG. 14 is an oblique view showing an example of a conventional head assembly comprising a slider, actuator and suspension.
Figure 15:
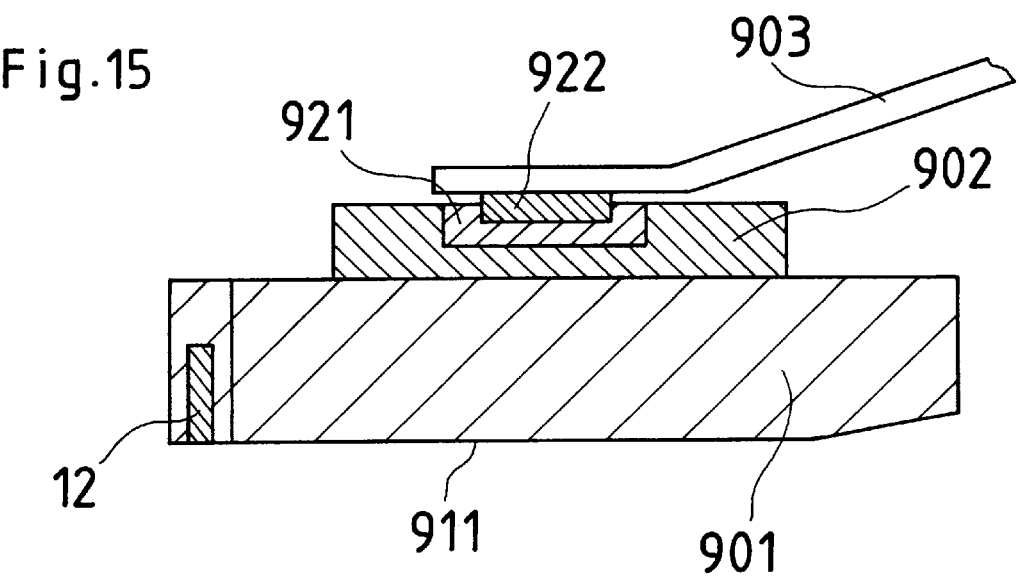
FIG. 15 is a cross-sectional view of the C–C' portion of FIG. 14.

A head slider is described with reference to FIG. 13. A hole portion 53, which passes through the slider 1 from the flying surface 11 side to the side opposite the flying surface, is manufactured, and a condenser lens 52 and an objective lens 51 are affixed to this hole portion 53. A laser beam irradiated from a laser light source is irradiated on an irradiation object via the condenser lens 52 and the objective lens 51.

An actuator 2 that has a suspension 3 is bonded to the step portion of the slider 1. This head assembly can be used in an optical disk drive, which utilizes an SIL head that uses an optical near field effect, or in a magneto-optical disk drive.

Further, a slider configuration provided only with an actuator minus a suspension also corresponds to an embodiment of the present invention.

As described above, by utilizing the slider or head assembly of the present invention, the center gravity of the slider or actuator assembly is not heightened, and the weight at the end of the head assembly does not increase, enabling highspeed, accurate tracking operations.

What is claimed is:

1. A slider having an actuator, comprising:
   a flying surface; and
   a stepped surface on a side of said slider opposite said flying surface, the stepped surface having a lower surface on which the actuator is mounted.

2. A slider having an actuator, comprising:
   a flying surface;
   a sensor portion in close proximity to said flying surface;
   a protective member, which covers said sensor portion; and
   a surface having a step formed on a side of said slider opposite said flying surface and in a location separated from said protective member, the step including an upper surface and a lower surface, wherein the actuator is mounted on the lower surface.

3. The slider according to claim 1 or claim 2, wherein the portion of said slider corresponding to the lower surface has a thin flat shape.

4. The slider according to claim 2, wherein said sensor portion is an optical head, or a magneto-optical head.

5. The slider according to claim 2, wherein said sensor portion is an MR head.

6. The slider and actuator assembly according to claim 5, wherein said actuator is driven by either electrostatic force or electromagnetic force.

7. A slider and actuator assembly, comprising:
   a slider comprising a flying surface, a sensor portion in close proximity to said flying surface, and a protective member covering said sensor portion, wherein a step formed in a side opposite said flying surface at a location separated from said protective member, the step including an upper surface and a lower surface; and
   an actuator to move said sensor portion, wherein the actuator is mounted on the lower surface of the step.

8. The slider and actuator assembly according to claim 7, wherein the actuator is fixed to the slider by a conductive adhesive between the actuator and slider.

9. The slider and actuator assembly according to claim 7, wherein the thickness of the slider and actuator assembly is in the range of 0.2–0.65 mm.

10. A head assembly, comprising:
    a slider comprising a flying surface, a sensor portion in close proximity to said flying surface, a protective member covering said sensor portion, and a stepped surface formed in a side opposite said flying surface at a location separated from said protective member, the stepped surface including an upper surface and a lower surface;
    an actuator mounted to the lower surface of the stepped surface; and
    a suspension connected to the surface of said actuator opposite the slider.

11. A head assembly, comprising:
a slider comprising a flying surface, a sensor portion in close proximity to said flying surface, a protective member covering said sensor portion, and a stepped surface formed in the side opposite said flying surface at a location separated from said protective member;
a positioning member mounted on a flat surface of said slider on the side opposite the flying surface;
an actuator mounted on the flat surface, the actuation being positioned by the positioning member; and
a suspension connected to the surface of said actuator opposite the slider.

12. The head assembly according to claim 10 or claim 11, wherein said suspension includes a wiring portion, and said sensor includes an electrode portion, and the wiring portion and electrode portion conduct electricity via bonding wire.

13. A head assembly, comprising:
a flying surface;
a sensor portion in close proximity to said flying surface;
a protective member covering said sensor portion;
a stepped surface formed in a side of the head assembly opposite said flying surface at a location separated from said protective member, the stepped surface having an upper surface and a lower surface;
an actuator mounted on the lower surface;
a suspension; and
an integrating structure to integrate the actuator and the suspension, the integrating structure being permanently mounted to the lower surface.

* * * * *